Nov. 10, 1970　　　K. M. MOORE ET AL　　　3,539,264
OPTICAL COMPARATOR FOR GEMS
Filed March 29, 1968　　　　　　　　　　　　　　　4 Sheets-Sheet 1

INVENTORS,
KENNETH M. MOORE
GALE M. JOHNSON
BY Lyon & Lyon
ATTORNEYS

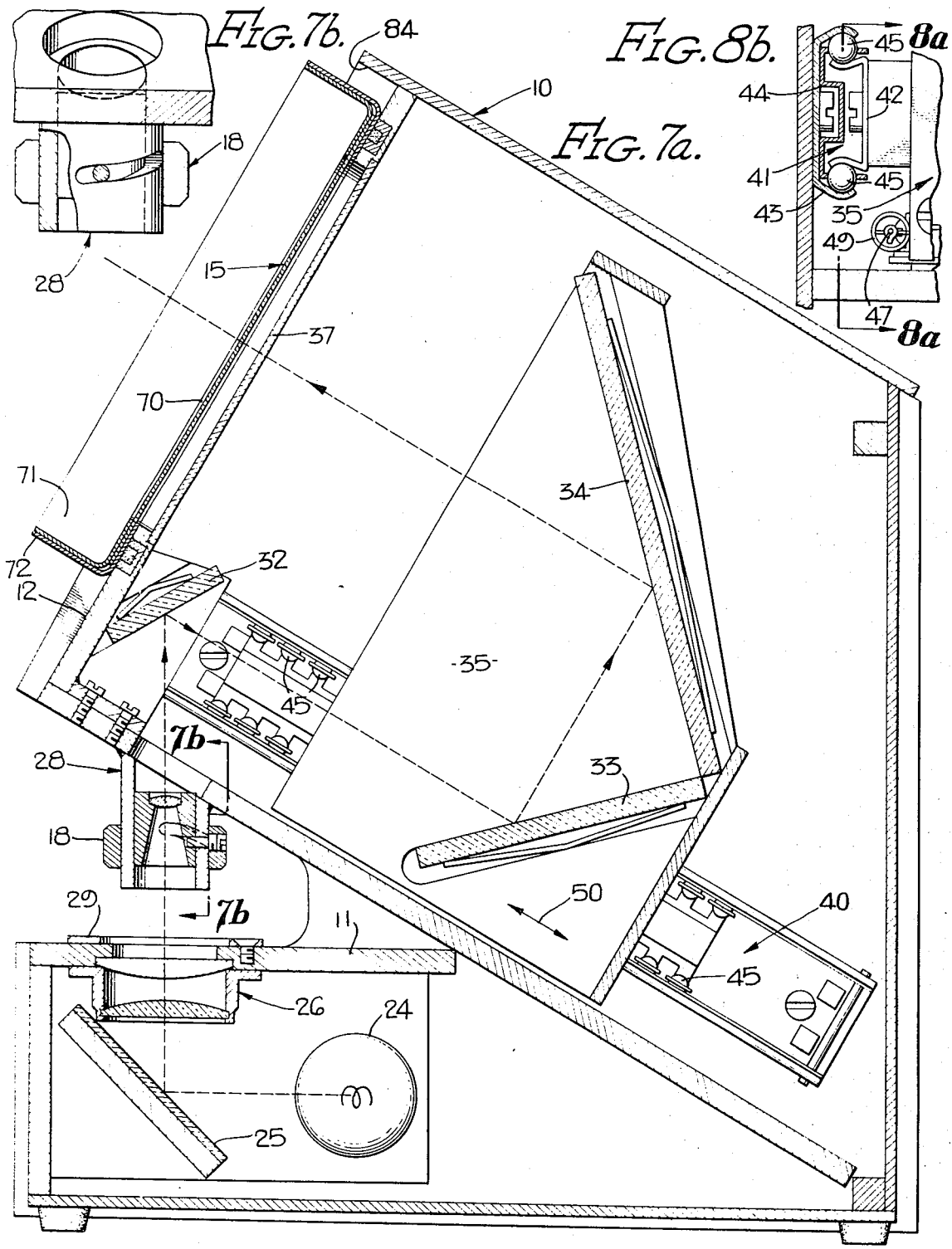

INVENTORS,
KENNETH M. MOORE
GALE M. JOHNSON
BY
Lyon & Lyon
ATTORNEYS

INVENTORS.
KENNETH M. MOORE
GALE M. JOHNSON
BY
Lyon & Lyon
ATTORNEYS

United States Patent Office 3,539,264
Patented Nov. 10, 1970

3,539,264
OPTICAL COMPARATOR FOR GEMS
Kenneth M. Moore, Granada Hills, and Gale M. Johnson, Los Angeles, Calif., assignors to Gemological Institute of America, Los Angeles, Calif., a corporation of Ohio
Filed Mar. 29, 1968, Ser. No. 717,171
Int. Cl. G01b 9/08; G03b 21/24
U.S. Cl. 356—165                                             7 Claims

ABSTRACT OF THE DISCLOSURE

The silhouette of a gem, such as a diamond, may be projected on a screen having a standard diagram thereon. The diagram and silhouette may be used to determine various characteristics of the gem including table diameter, total depth, crown height, pavilion depth, girdle thickness, and so forth. An apparatus is described having a lamp and optical system for projecting light through a gem and providing the silhouette on the screen. Magnetic attraction provided by magnets is employed in conjunction with a gem holder and the screen for enabling easy adjustment of each and for retaining the same in place once properly positioned.

---

This invention relates to optical comparison, and more particularly to a method and apparatus for projecting the silhouette of a gem on a screen to determine various characteristics thereof.

In the past, gems have been examined by magnifying optical devices to determine characteristics and proportions thereof. However, this generally is a time consuming operation. It is accordingly a principal object of the present invention to provide a method and apparatus for simplifying the determination of characteristics of a gem.

It is an additional object of this invention to provide a method whereby various characteristics, such as table diameter, total depth, crown height, and so forth, may be readily and simply determined.

It is a further object of this invention to provide an apparatus for enabling certain characteristics of gems to be readily ascertained.

Another object of this invention is to provide an apparatus for use in determining the characteristics of gems, which apparatus has gem holding and classifying means retained by magnetic attraction.

These and other objects and features of the present invention will become better understood through a consideration of the following description taken in conjunction with the drawings in which:

FIG. 7a is a cross-sectional side view of the comparator of FIG. 1 illustrating the optical system therein and carriage system for moving mirrors thereof;

FIG. 7b is a view taken along a line 7b—7b of FIG. 7a;

FIG. 8b is a view taken along a line 8b—8b of FIG. 8a;

Figure 9:
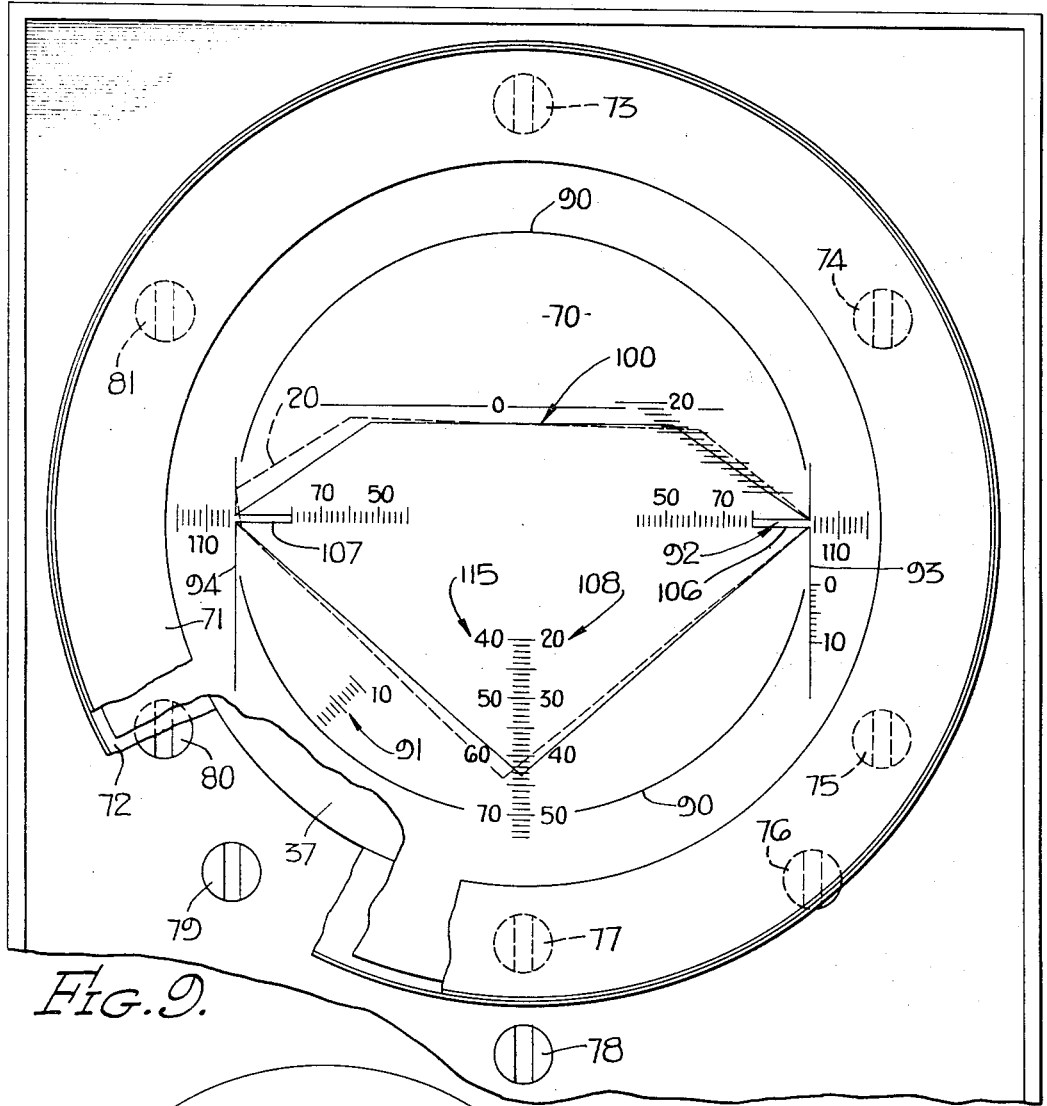
FIG. 9 is an enlarged view of a portion of the front surface of the comparator illustrating in detail the screen and diagram thereon.

Turning now to the drawings, a comparator according to the present invention is illustrated and includes a case or housing 10 having a stage area 11 and a slanted front surface 12. A C-shaped stone holder 13 is set upon the stage area, and light passing through a stone 14 held by the holder 13 casts a silhouette of the stone onto a screen 15. The holder 13 and screen 15 are retained in position by magnets as will be discussed below. Rotation of a knob 17 controls the magnification of the silhouette, i.e., provides a zoom feature, and rotation of a knob 18 controls focus. As will be explained in greater detail subsequently, dashed lines 20 in FIG. 9 illustrate the silhouette of a diamond.

Before considering the manner in which the various characteristics of a stone are determined, the optical system of the comparator will be described with reference to FIGS. 7 and 8. Within the case 10 and below the stage 11 there is mounted a lamp 24, a fixed mirror 25 and a condensing lens unit 26. Light from the lamp 24 is directed by the mirror 25 up through the condensing lens unit 26 whereup the light passes through the stone (not shown in FIG. 7) and into a focusing lens 28, the focus of which is varied in a conventional manner by the focus knob 18. A metal platform ring 29 mounted on the stage area 11 above the condensing lens unit 26 for supporting the stone holder 13.

Figure 8A:
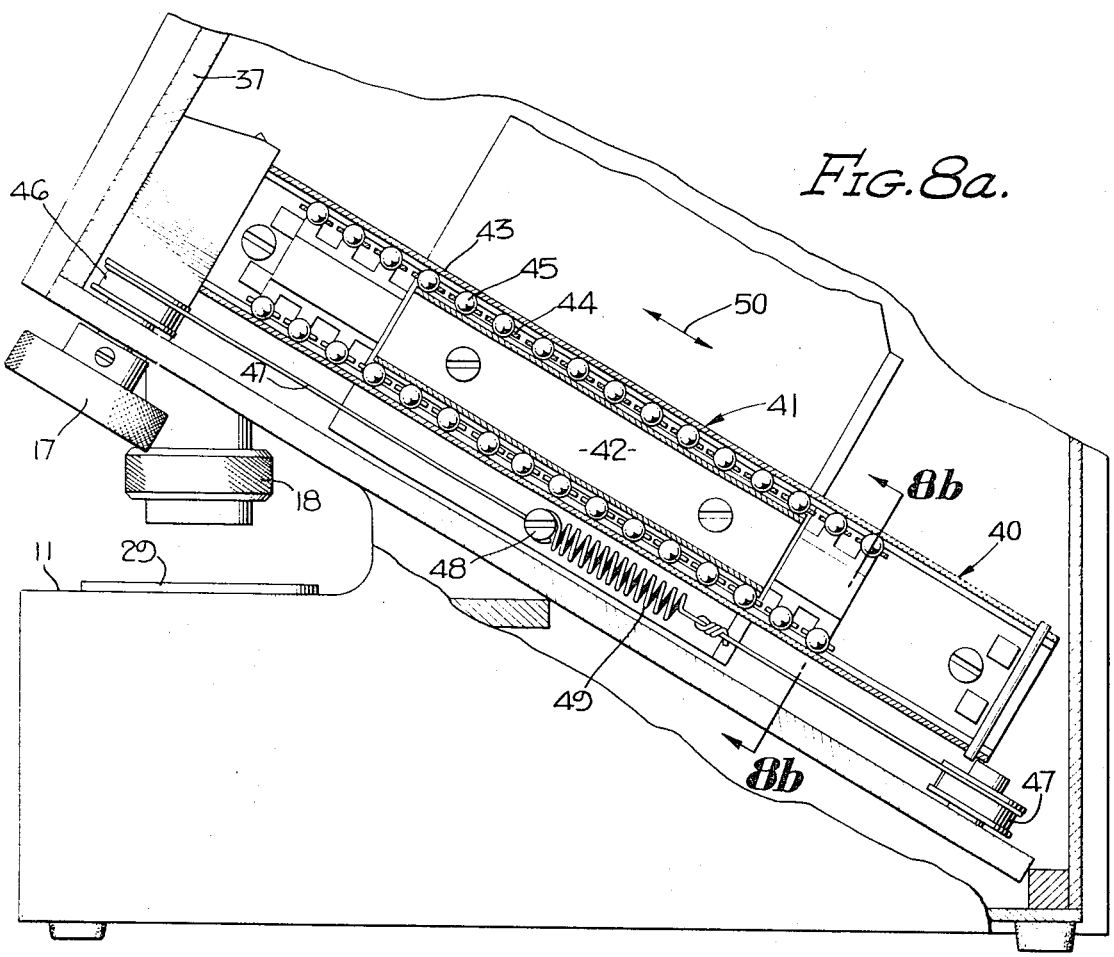
FIG. 8a is a partial cross-sectional view similar to FIG. 7a and which further shows the carriage system.

The light after passing through the stone and the focusing lens 28 is then reflected by a stationary mirror 32 onto mirrors 33 and 34 of a movable mirror unit 35. The light reflected from the mirror 34 passes through a cover glass 37 and onto the screen 15. The mirror unit 35 is mounted within the case 10 on slide mechanisms 40 and 41, both of which are alike. The mechanism 41 (see FIGS. 8a and 8b), for example, includes a slide 42 affixed to the side of the mirror unit 35, a track 43 mounted on the side of the case 10 and a ball carriage 44 holding a plurality of balls 45 retained between the slide 42 and track 43. The knob 17 is connected to a shaft which in turn is connected to a pulley 46 (see FIG. 8a). A cable 47 is wound about the pulley 46 and a pulley 47, the ends of the cable being connected at 48 to the side of the movable mirror unit 45 and to a tensioning spring 49 as illustrated in FIG. 8a. With this arrangement, rotation of the knob 17 causes the movable mirror unit 35 to move back and forth as indicated by arrows 50 in FIGS. 7a and 8a to change the magnification of the silhouette and, thus, to cause the same to be larger or smaller on the screen 15.

Figure 2:
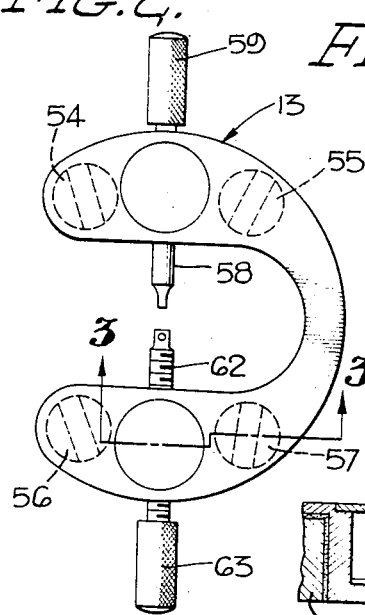
FIG. 2 is a plan view of a gem or stone holder used with the comparator of FIG. 1.
Figure 4:
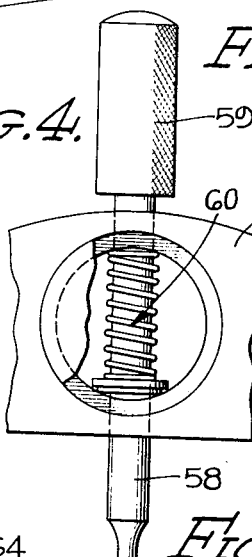
FIG. 4 is a partial view of a portion of the holder shown in FIG. 2.
Figure 3:
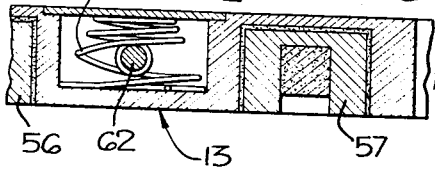
FIG. 3 is a partial cross-sectional view of the holder taken along a line 3—3 of FIG. 2.

In order to facilitate the positioning of the stone-holder 13 and the screen 15, the same are retained in position through the use of permanent magnets. Considering first the stoneholder 13, the bottom side thereof has four permanent magnets 54 through 57 mounted therein. Each of these magnets may be retained in a bore by an adhesive, such as an epoxy resin (note FIG. 3). The holder 13 also includes a spring loaded stem having a knurled handle 59, and a spring 60 as shown in FIG. 4 for biasing the stem to the position shown in FIGS. 2 and 4. Also provided is a threaded stem 62 having a knurled handle 63. The stem 62 is threaded through the holder, and a spring 64 is provided to frictionally engage the stem 62 to serve as an anti-jar device.

Figure 1:
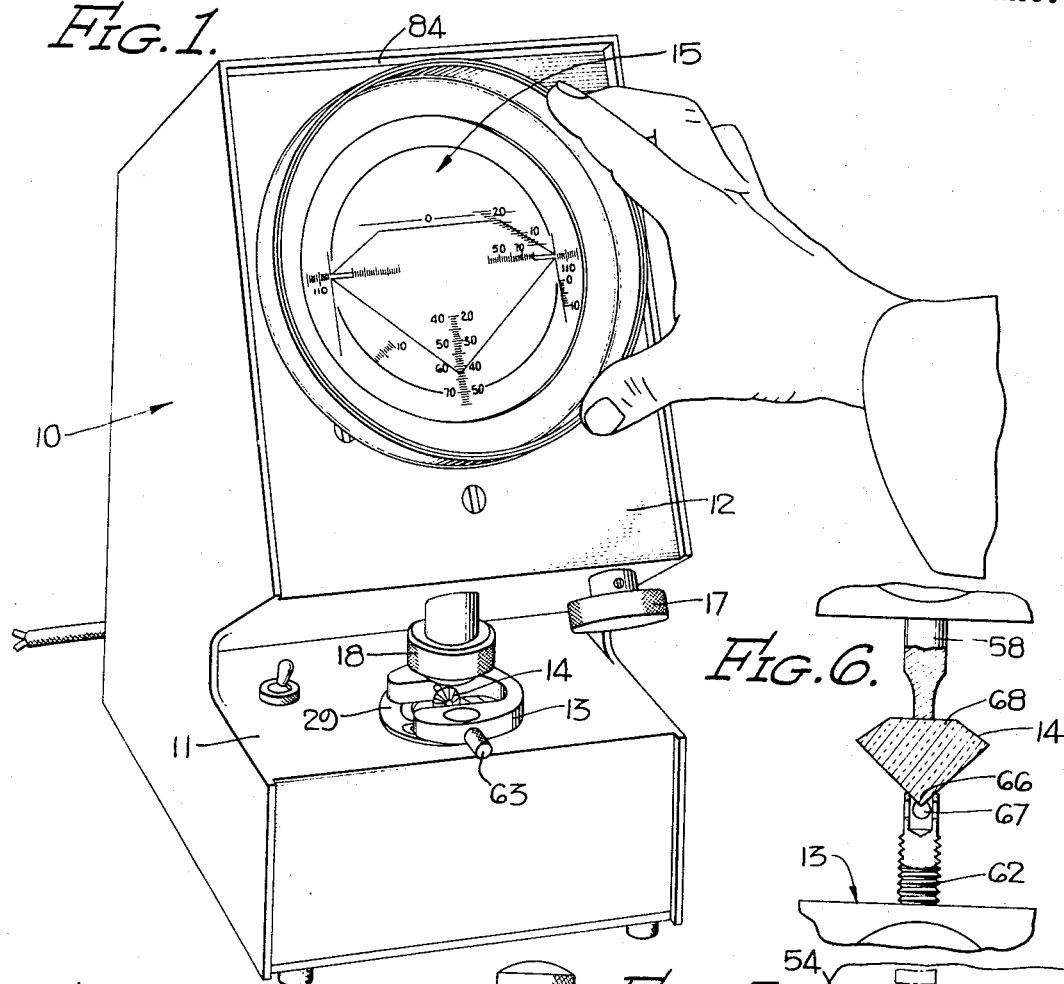
FIG. 1 is a perspective view of an optical comparator for determining characteristics of a gem according to the present invention.
Figure 6:
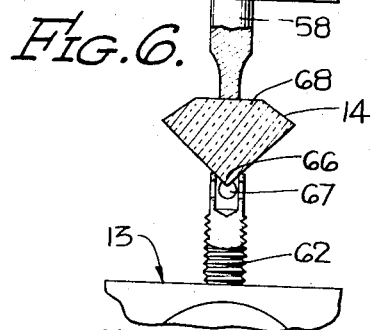
FIG. 6 is an enlarged fragmentary view of the holder illustrating the manner in which it retains a gem or stone.
Figure 5:
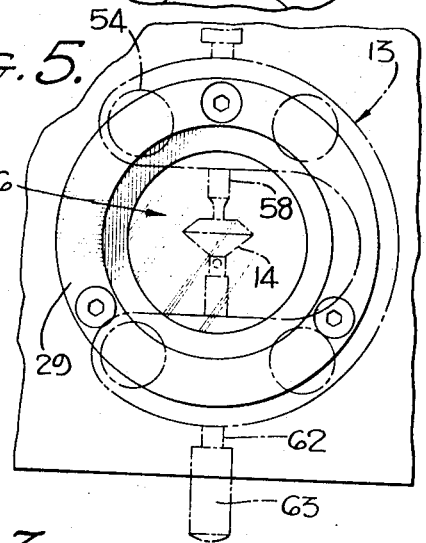
FIG. 5 is an enlarged view showing the holder positioned on the comparator of FIG. 1.

The stone 14 is retained in the stoneholder as best illustrated in FIG. 6. The culet 66 of the stone is placed in the open end 67 of the stem 62, and the flat face of the stem 58 is adjacent the table 68 of the stone. Thus, the end of the spring loaded stem 58 rests on the table thereby holding the stone 14 in position. The stoneholder 13 is then centered over the metal ring 29 (note FIG. 5) with the magnets therein facing down. The magnets are attracted to the ring 29 and thereby hold the stoneholder in position. The holder is initially positioned as shown in FIG. 1 thereby placing the knurled handle 63 of the threaded stem 62 in front of the operator for easy rotation of the stone 14.

Turning now to the construction of the screen 15, the same includes a diagram sheet 70 sandwiched between a pair of rims 71 and 72. The sheet 70 may be made of plastic material having one side slightly frosted. The front surface 12 of the housing 10 includes a plurality of magnets 73 through 81 like the magnets 54 through 57 for retaining the screen in position while still allowing the position of the screen to be adjusted so as to cause the markings on the diagram sheet to properly overlie the silhouette of the stone as will be described below.

Turning now to the determination of gem characteristics according to the present invention, the proportioning of a diamond, as is known, is judged by the measurement of the table diameter, total depth (table to culet), crown height, pavilion depth and girdle thickness. All measurements are made in percentages of the girdle diameter. These measurements, as well as other vital information including girdle roundness and off-center culet, may be determined relatively simply and quickly by employing the concepts of the present invention. In addition to the stoneholder 13, a round transparent glass disc (not shown) is placed on the metal platform ring 29 and used to determine whether or not the girdle of a round brilliant is out of round and, if so, the percentage of the out-of-roundness. The stone is placed table down in approximately the center of the glass disc and then is centered on the ring 29. The stoneholder 13 is used in making other measurements. As noted earlier, the stone is held by table and culet (FIG. 6); and the holder 13 is then centered over the metal ring 29 with the magnets down to retain the holder in position.

Different size screens with diagrams of different sizes may be used for different size stones. The screen 15 shown in FIG. 1 is useful for proportioning brilliants of about 1.21 to over 8 carats. A smaller screen may be used for brilliants ranging from approximately .18 to 1.30 carats with a size for pear-shapes, ovals and marquises that is somewhat higher. An optivisor or similar binocular loupe can be of assistance when using a smaller screen.

With the screen 15 and stoneholder 13 with a stone therein in position, a silhouette of the stone is projected onto the screen 15 as noted above. The focus knob 18 may be turned to bring the stone into focus, and the knob 17 may be adjusted to change the magnification and thus change the size of the silhouette. The magnification control affects focus, and in order to obtain a sharply focused silhouette of the desired size it is necessary to alternately use the focus control and magnification control several times, with each adjustment becoming progressively smaller.

The positioning of the silhouette of the stone on the screen can be accomplished by moving either the stoneholder or the screen. Inasmuch as movements of the stoneholder are magnified by the optical system while movements of the screen are not, it is preferable to make fine adjustments with the screen and coarse adjustments with the stoneholder. When using the screen to determine girdle roundness, the screen should be centered over the round glass 37 (FIG. 7a). When using this screen for any other measurement, it should be centered over the glass 37 and then moved directly upwardly until the screen holder ring 72 touches the top overhang 84 of the case 10. Then the necessary adjustments with the focus knob 18, magnification control 17 and the stoneholder 13 are made to almost position the silhouette as desired, and then the final adjustments are made using the screen 15.

Turning now to the various steps in proportioning a stone, the first procedure in a grading process of a round brilliant-cut diamond is to check the girdle thereof for roundness. The stone is positioned on the glass disc on the metal ring 29 as described above with the table of the stone down, and the silhouette of the girdle of the stone is compared with a circle 90 on the screen diagram 70 shown in FIG. 9. When the maximum diameter of the stone just fills the circle 90 on the screen, any out of roundness will appear as a gap between the silhouette and the circle. In the lower left quadrant of the circle a scale 91 is provided for measuring the degree of out-of-roundness. Each division of this scale 91 may represent one percent of the girdle diameter, and the screen may be rotated so that the scale appears at the gap and then the percentage read directly from this scale. If the stone is oval, there will be a similar gap or flat on the opposite side thereby requiring the percentage to be doubled.

Figure 10:
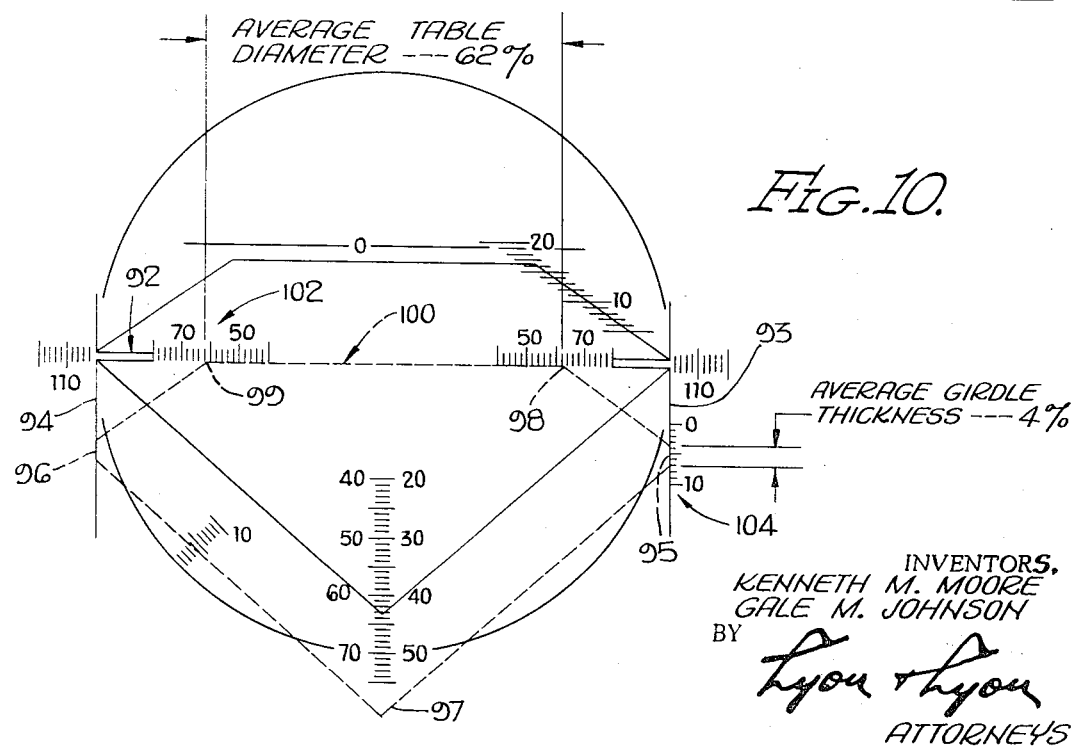

After checking girdle roundness, and before changing either the focus control 18 or magnification control 17, the stone is removed from the glass disc and set in the magnetic stoneholder 13. The holder 13 then is positioned on the metal ring 29 as described above. Using only the stoneholder 13 and the focus control 18, the silhouette of the stone is positioned so that the girdle is parallel to the girdle 92 of the diagram, and the edges of the girdle just reach two vertical lines 93 and 94 as shown in FIG. 10. If the stone is out of round, the same should be rotated by the knob 63 until the greatest diameter of the girdle is found, and then the focus control 18 used to adjust the size of the silhouette until the edges 95 and 96 of the silhouette just reach the respective vertical lines 93 and 94. It should be noted that if the crown height of the stone is greater than 16.2 percent, the smallest diameter of the girdle should be used. However, in the last forty years very few stones have been cut with a crown height of greater than 16.2 percent and therefore the minimum diameter is seldom used. On the other hand, American Gem Society diamond standards require that the average diameter of the girdle be used. This is found by rotating the stone and used the same as the maximum diameter or minimum diameter as described above.

The stone is again rotated until the culet is exposed through the holes in the open end 67 of the threaded stem 62 (note FIG. 6), and the silhouette of the diamond is a straight line from table to girdle on each side of the silhouette. The maximum rotation in this case is one sixteenth of a turn. Using the stoneholder first and then the screen 15, the silhouette of the stone is adjusted on the diagram until the sharp corners 98 and 99 (FIG. 10) of the table 100 are on the lower ends of the lines of the scales 101–102, respectively, which cross the girdle 92 of the diagram, and until the edges 95 and 96 of the girdle just reach the respective vertical lines 93 and 94. The percentage of the table diameter is read directly from the scale 101–102 on the girdle 92 of the diagram, and each division of the scale may be two percent. The reading from each corner 98 and 99 of the table should be approximately the same. If the difference is greater than two percent, the table 100 is considered to be off-center. The ideal table diameter percentage is 53 percent, but 52 percent to 57 percent is considered an ideal range. The table diameter illustrated in FIG. 10 is 62 percent.

Without moving the stone or screen from the last position, the girdle thickness percentage can be read directly from the side scale 104 on the line 93 which the right edge 95 of the girdle silhouette is touching. Preferably, the stone should be rotated one complete turn and the girdle thickness measured at each of the eight bezel facets to arrive at an average girdle thickness percentage. The divisions on the scale 104 are each one percent, and the thickness shown in FIG. 10 is approximately 3.5 percent. The ideal girdle thickness percentage depends on the size of the stone. The following approximations are reasonable guides:

.40 ct. stone—girdle thickness not greater than 3.0%
.80 ct. stone—girdle thickness not greater than 2.5%
1.50 ct. stone—girdle thickness not greater than 2.0%
3.00 ct. stone—girdle thickness not greater than 1.75%
Over 3.00 ct. stone—girdle thickness not greater than 1.5%

The pavilion depth percentage can be determined by moving only the screen 15 and not disturbing the stoneholder, focus control or magnification control. The screen 15 is lowered until the lower girdle lines 106–107 on the diagram exactly correspond to the same points on the silhouette as illustrated in FIG. 9. The pavilion dept percentage is read from the right middle scale 108 which runs through the culet. Each division of this scale is one percent, and the ideal pavilion depth percentage is 42.1 percent, but 42.9 percent 43.3 percent is considered an ideal range. The depth shown in FIG. 9 is 45 percent.

Figure 11:
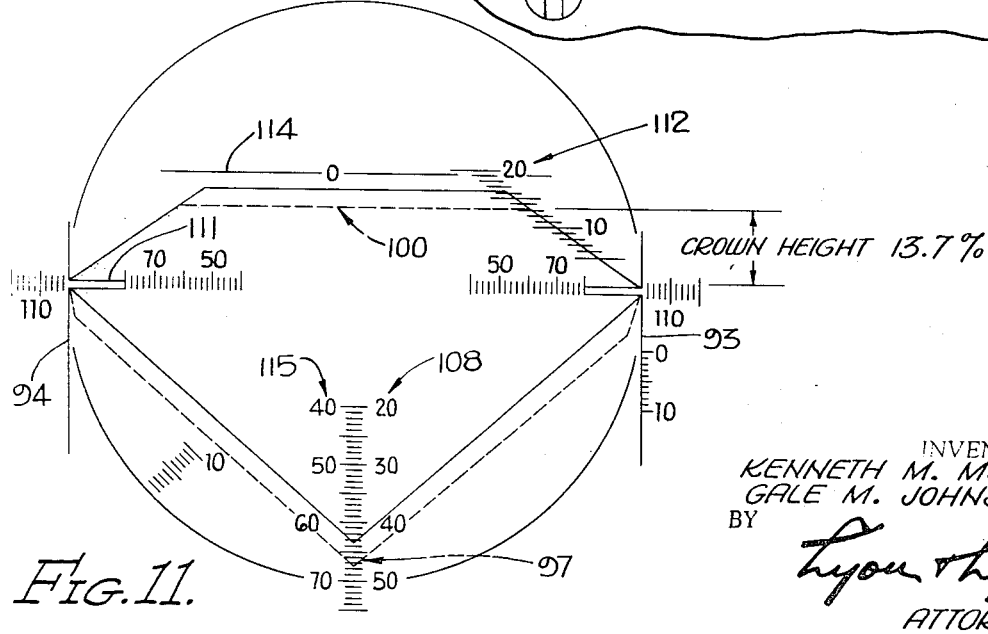
FIGS. 10 and 11 are views of the diagram and silhouette of a stone.

With the stoneholder, focus the magnification controls left in position, the crown height percentage is determined by realigning the screen 15 so that the upper girdle lines 110 and 111 (see FIG. 11) at the vertical lines 93 and 94 at the edges of the girdle on the diagram exactly correspond to the same points on the silhouette. The crown height percentage is read from the scale 112 on the right side of the crown on the diagram. The stone should be rotated one complete turn and the crown height checked at each of the eight bezel facets to determine if the table 100 of the stone is tilted in relation to the plane of the girdle. Each division on the scale is one percent. The ideal crown height percentage is 16.2% but 15.1% to 16.5% is considered an ideal range. In FIG. 11 the crown height is 13.5%. Note that the girdle is tilted toward the culet. This is a frequent occurrence on round brilliants cut from octahedral shaped rough.

With the stoneholder, focus control and magnification control remaining in the same position, the screen 15 is lowered until the table of the silhouette just touches the zero line 114 and the edges of the girdle of the silhouette just touch the vertical lines 93 and 94. The total depth percentage is read from the left middle scale 115 running through the culet on the diagram at the culet of the silhouette. Each division of the scale is one percent.

When the total depth percentage has been taken, the stone can easily be checked for off-center culet (see FIG. 9). The stone is rotated and the position of the culet 97 in relation to the center line of the scale 115 is noted. The percentage the culet is off-center can be measured with the shorter lines on the scales 108 and 115 which have a length of 3%; i.e., 1½% on each side of the center line of the scales 115 and 108.

If a diamond is an old-miner (with a cushion-shaped girdle) or an old-European (with a round girdle but with both crown and pavilion too large), the weight after recutting is easily figured by using the present girdle diameter, taking 61% of the figure to arrive at the new depth and using the Leveridge-gauge or Moe-gauge tables. If the tables are not available, the following formula may be used:

$$\text{radius}^2 \times \text{depth} \times .0245$$

where the radius is one-half of the girdle diameter. If the pavilion depth is correct and the crown is shallow, there is little point in recutting the stone, because this is the standard spread stone so frequently sold today. If the stone is too shallow, both in crown and pavilion, the new weight may be determined by multiplying the depth by 1.666 to obtain the new diameter. Then either the Leveridge-gauge tables, the Moe-gauge tables or the formula given above may be used. The comparator of the present invention is not necessary for the recutting determinations described thus far; however, it becomes necessary if unsymmetrical, broken or shallow-crowned and deep-pavilioned stones are to be recut. To evaluate stones of this kind, it is necessary only that the silhouette be enlarged to the point where the ideal diagram 70 on the screen 15 is contained just within the enlarged silhouette in the table-to-girdle direction.

When this has been completed, the girdle edges of the silhouette will be beyond the two vertical lines 93 and 94. To determine the dimensions after recutting, first read the scales 101 and 102 at the points reached by the girdle of the silhouette and apply the scale reading to the following formula:

$$\frac{\text{Actual diameter} \times 100}{\text{Scale reading}} = \text{New diameter}$$

Assuming, for example, the scale reading is 120, the new diameter equals the present diameter times 100 divided by 120. The new depth would be 60% of the new diameter, which was determined by the method just explained. With these figures, the Leveridge-gauge or Moe-gauge tables may be used to estimate the weight of the stone after recutting.

The recut weight of a diamond that has a break on the girdle may be determined readily with the screen 15. First, following the procedure used in checking girdle roundness, the percentage the girdle diameter will be reduced is found and this percentage is applied to the measured girdle diameter. Then, using the new diameter, refer to the Leveridge-gauge or Moe-gauge tables for the recut weight.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for facilitating proportioning a stone comprising:

housing means having a substantially horizontal table area upon which a stone may be positioned and an upwardly inclined display area at which a silhouette of such stone may be displayed, said housing means including an illumination and optical system for passing light through a stone positioned on the table area and for projecting a silhouette thereof to said display area, said optical system including movable mirror means and means for adjusting the position of said movable mirror means for varying the size of said projected silhouette, and screen means having a diagram and being adjustably mounted on said display area of said housing, said screen means being retained on said housing means by magnetic attraction to allow the diagram on said screen means to be readily positioned with respect to said silhouette.

2. An apparatus as in claim 1 including:
holder means for retaining said stone, said holder means having magnet means coupled therewith for retaining said holder means on said table area of said housing means.

3. An apparatus as in claim 1 including:
a holder for retaining said stone including a body member having magnet means affixed thereto for enabling said body member to be retained by magnetic attraction on said table area, stem means coupled with said body member for engaging the table of a stone, and movable stem means coupled with said body for engaging the culet of said stone.

4. An apparatus as in claim 1 wherein:
said housing means has a plurality of permanent magnets affixed thereto at said display area for retaining said screen means.

5. An optical comparison device for comparing a silhouette, picture, or the like, of an object with a predetermined diagram comprising:

screen means having a diagram thereon, projection means for projecting a silhouette, image, picture, or the like, of an object onto said screen means, and magnet means coupled between said screen means and said projection means for enabling said screen means to be readily adjusted with respect to said projected silhouette, image, picture, or the like, while maintaining said screen means secured to said projection means.

6. An apparatus as in claim 5 including:

object holder means mounted on said projection means, and magnet means between said object holder means and said projection means for enabling said holder means to be readily positioned with respect to said projection means.

7. An apparatus for facilitating proportioning of precious stones comprising:

housing means having a substantially horizontal table area upon which a stone may be positioned and an upwardly inclined display area at which a silhouette of such stone may be displayed, said housing means including illumination means for directing light through said table area and said stone and including an optical system for receiving light passed through said stone and directing the same to said display area for projecting a silhouette of the stone to said display area, said optical system comprising a plurality of relatively movable reflectors which are adjustable to vary the effective optical path length between said table area and said display area for varying the size of said silhouette at said display area, said optical system including focusing means for focusing said silhouette at said display area, and screen means having a diagram of physical characteristics of a stone and being adjustably mounted on said display area of said housing, and a plurality of magnets communicating between said screen means and haid housing at said display area while allowing said diagram on said screen means to be readily positioned with respect to said silhouette for facilitating proportioning of a stone.

References Cited

UNITED STATES PATENTS

| 2,372,470 | 3/1945 | Bergstrom et al. | 356—165 |
| 2,380,567 | 7/1945 | Yawitz et al. | 356—165 |
| 2,510,998 | 6/1950 | O'Brien | 356—164 |
| 2,552,238 | 5/1951 | Turner et al. | 350—30 |
| 2,742,813 | 4/1956 | Zeininger | 353—79 |
| 3,077,815 | 2/1963 | Coakley | 356—165 |
| 3,225,647 | 12/1965 | Robinson et al. | 356—30 |

RONALD L. WIBERT, Primary Examiner

J. ROTHENBERG, Assistant Examiner

U.S. Cl. X.R.

353—73, 80; 356—30, 168, 171